United States Patent [19]

Crisler et al.

[11] Patent Number: 5,103,465
[45] Date of Patent: Apr. 7, 1992

[54] SYMBOL SYNCHRONIZATION CIRCUIT

[75] Inventors: Kenneth J. Crisler, Wheaton; Mark J. Marsan, Elmhurst, both of Ill.

[73] Assignee: Motorola, Inc., Schaumburg, Ill.

[21] Appl. No.: 398,679

[22] Filed: Aug. 25, 1989

[51] Int. Cl.[5] .......................... H04L 7/02; H04L 7/033
[52] U.S. Cl. ..................................... 375/110; 375/119
[58] Field of Search ................ 375/106, 110, 120, 119, 375/101, 118; 371/47.1

[56] References Cited

U.S. PATENT DOCUMENTS 4,841,551  6/1989  Avaneas ............................. 375/118
4,847,876  7/1989  Baumbach et al. ............. 375/120 X Primary Examiner—Benedict V. Safourek
Assistant Examiner—Ralph E. Smith
Attorney, Agent, or Firm—Wayne J. Egan

[57] ABSTRACT

An improved symbol synchronization circuit is provided for generting a clock signal in a receiver having an input signal comprising a stream of symbols at a symbol rate of $f_{symbol}$. According to the invention, a correlator is provided that operates on a multiplicity (k) of multi-phase signals, $\phi_1-\phi_k$, each signal more or less synchronized with the stream of symbols and each having a frequency $f_{clock}$ generally equal to a multiple of $f_{symbol}$. Based on the current synchronization of each signal $\phi_1-\phi_k$ with the stream of symbols, and also based on the past history of the synchronization of each signal with the stream of symbols, one member from the group of signals $\phi_1-\phi_k$ is periodically selected as the clock signal. This selected clock signal is then delayed to compensate for the drift between $f_{symbol}$ and $f_{clock}$.

8 Claims, 4 Drawing Sheets

SYMBOL SYNCHRONIZATION CIRCUIT

TECHNICAL FIELD

This invention pertains generally to synchronization or clock recovery circuits and more particularly to clock recovery circuts that may be used in communication receivers.

BACKGROUND OF THE INVENTION

Digital communication systems must use accurate clock recovery mechanisms to achieve the lowest possible error rate in the received information. The clock recovery scheme must not only determine the correct data rate, but also must determine the optimum point at which to sample the received signal. Any deviation from the optimum sampling point increases the effect of inter-symbol interference and decreases the signal-to-noise ratio. This is particularly important in highly efficient modulation schemes, such as Multilevel Sub-Band Coding, where many symbols represent 256-level data. Multi-phase signal correlators determine the optimum sampling point to within the reciprocal of the number of phases used in the correlations times the symbol period. Any attempt to increase the precision of these correlators results in extensive additional hardware or additional processing time if the correlations are done by a digital signal processor (DSP) such as, for example, the DSP56001 available from Motorola, Inc., 1301 East Algonquin Road, Schaumburg, Il 60196. In addition, as the recovered clock drifts with respect to the transmitted symbol rate, the recovered sample point will drift within its range of precision. As a result, there is a need for an improved symbol synchronization circuit.

SUMMARY OF THE INVENTION

It is an object of the invention, therefore, to provide an improved symbol synchronization circuit. Accordingly, an improved symbol synchronization circuit is provided for generating a clock signal in a receiver having an input signal comprising a stream of symbols at a symbol rate of $f_{symbol}$. According to the invention, a correlator is provided that operates on a multiplicity (k) of multi-phase signals, $\phi_1$-$\phi_k$, each signal more or less synchronized with the stream of symbols and each having a frequency $f_{clock}$ generally equal to a multiple (m) of $f_{symbol}$, where m may be any integer, including 1. Based on the current synchronization of each signal $\phi_1$-$\phi_k$ with the stream of symbols, and also based on the past history of the synchronization of each signal with the stream of symbols, one member from the group of signals $\phi_1$-$\phi_k$ is periodically selected as the clock signal. This selected clock signal is delayed either before or after the selection process in a time-varying manner based on the difference between $f_{symbol}$ and $f_{clock}$. The amount of delay required is changed periodically to compensate for the difference between $f_{symbol}$ and $f_{clock}$.

DETAILED DESCRIPTION

Figure 1:
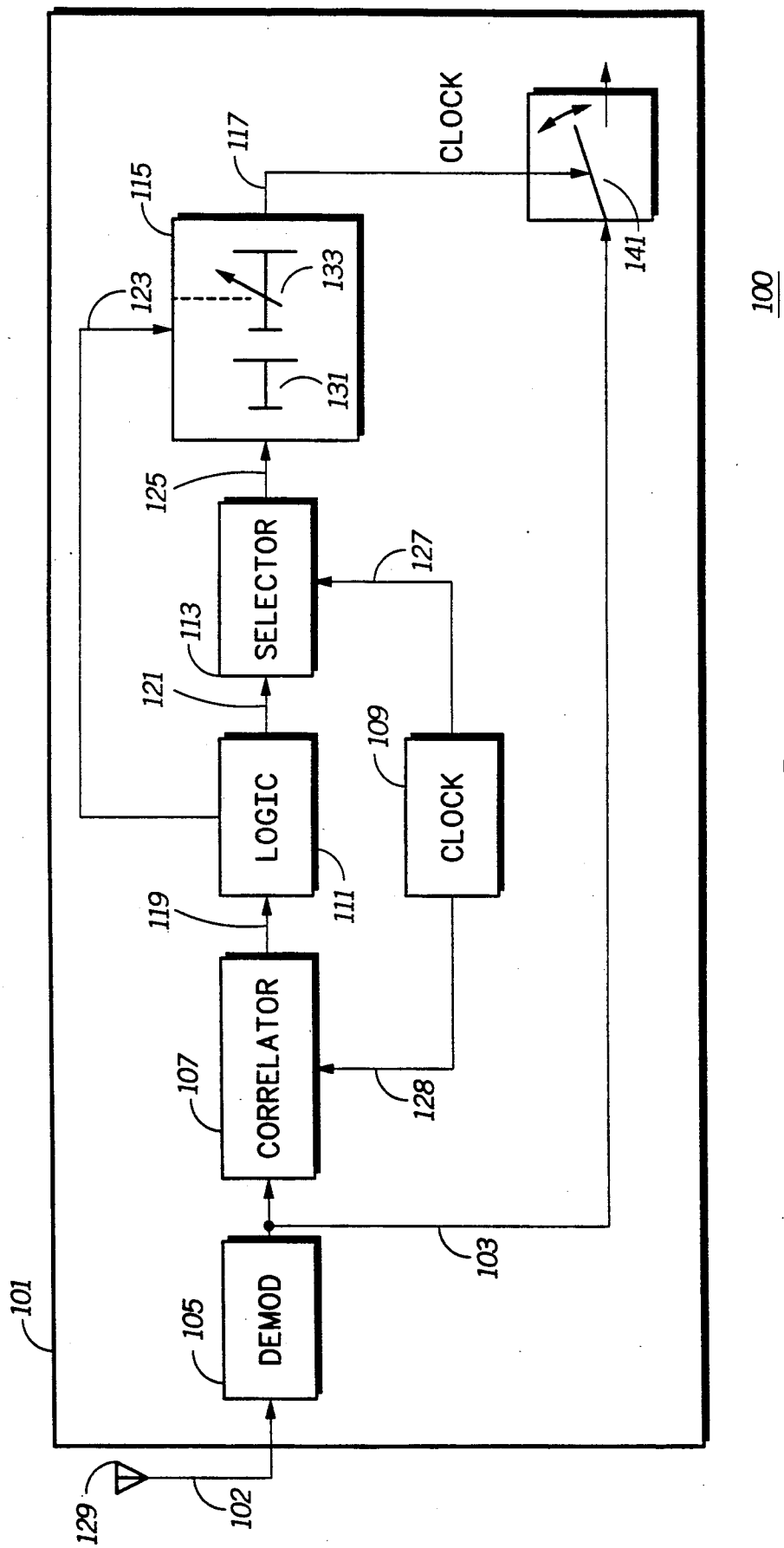
FIG. 1 is a block diagram showing a first embodiment of the symbol synchronization circuit, according to the invention.

FIG. 1 is a block diagram showing a first embodiment 100 of the invention. Although this figure depicts the embodiments as being used with a radio receiver 101 for receiving signals via a radio frequency channel 129, it will be appreciated that the present invention may be used in any application wherein it is desired to recover clock or timing information from a received signal. One familiar example here is a data communications modem which, as is known, may be used for receiving data communications signals via a telephone channel.

As is shown, the received and demodulated signal 103 is coupled to a correlator 107. As shown, the clock 109 provides a first clock signal 128 to the correlator 107, and a second clock signal 127 to the selector 113. It will be appreciated that the first clock signal 128 may or may not be identical to the second clock signal 127. For instance, one may be a multiple of the other.

The correlator 107 samples the received signal 103 at some multiple (m) of the anticipated symbol rate using the set of k clock phase signals (or $\phi$'s) generated by the clock 109, resulting in a separate representation (word) of the received information for each of the k possible phases of the recovered clock. In general the clock 109 may provide $\phi$'s with a frequency at a multiple (m) of the anticipated symbol rate, however the remaining description of the first embodiment will refer to the case of m=1. The k sets of data symbols are compared periodically against a known data pattern or "flag" which is inserted in the transmitted signal from time to time for the purpose of establishing receiver synchronization. If one or more of the k words match the flag within some predetermined tolerance, the correlator indicates a match condition and determines 119 which of the k $\phi$'s to use as the symbol sampling clock based on which of the k$\phi$'s matched. The correlator 107 attempts to estimate the best sampling point of the received symbol from the received signal 103 by picking the middle $\phi$ from those whose data words matched the known pattern. For example, if k=8 and $\phi_4$, $\phi_5$, and $\phi_6$ matched, then the best estimate of the symbol center would be sampled using clock $\phi_5$. The chosen $\phi$ is updated in this manner periodically to maintain the sampling point near the center of the received symbol. It will be appreciated, however, that the sample point may drift between updates due to the assumed frequency difference between the transmit symbol rate and the receiver clock frequency. The correlator choices act to limit this drift and thus the correlator precision to approximately the reciprocal of the number of phase signals k times the symbol duration. Thus, for k=8, the sample point may vary +/− one sixteenth (1/16) of the symbol duration around the optimum sample point.

Figure 2:
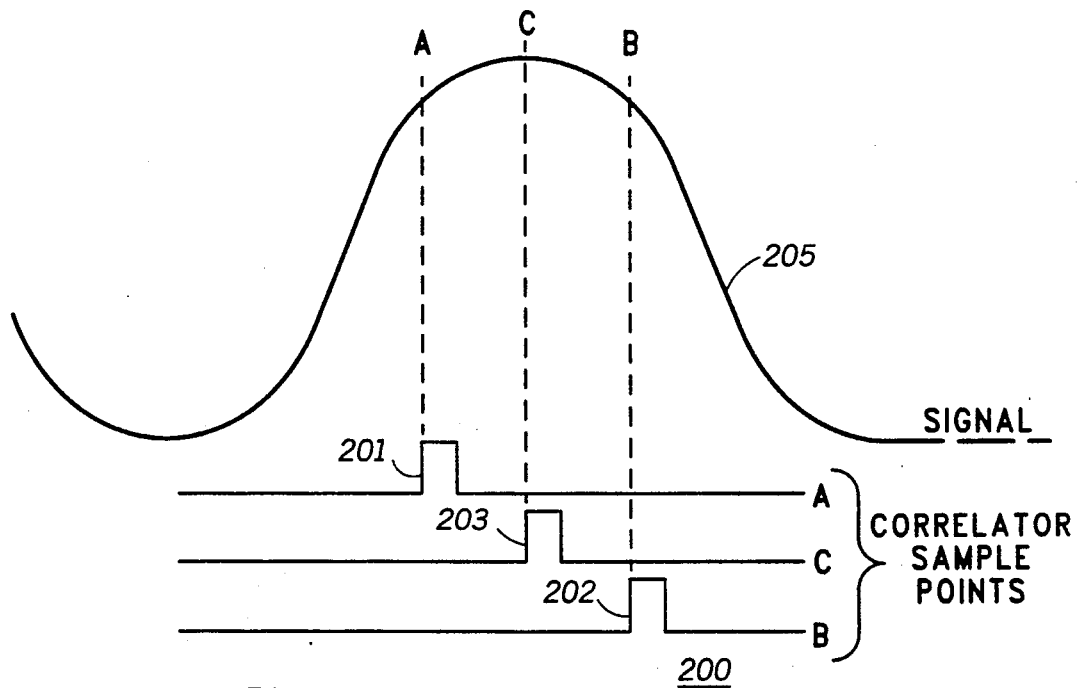
FIG. 2 shows a typical received signal with three sample points A, B, C.

The movement of the $\phi$ choice 119 should be responsive to the drift of the receiver clock due to the frequency difference between it and the transmit symbol clock. This is therefore a relatively slow adjustment, with a change in $\phi$ typically required only every few seconds. The pattern of the $\phi$ movement, which is related to the relative stability of the transmit and receive clock sources, is also generally in the same direction, increment or decrement, for long periods of time with a consistent time span between changes. The chosen sample point, as determined by the correlator, can be seen to drift across the optimum sample point of the received signal 205 as shown in FIG. 2. Immediately after a change of $\phi$, assume the sample point is at A (201). The frequency error will cause the point to drift towards B (202), with the sampling occurring at the optimum point C (203) only a short time during the drift period. When the sample point reaches B (202), the action of the correlator will change the choice of $\phi$, moving the sampling point back to A (201), where the drift cycle begins again. Under strong signal conditions, this is in fact what occurs. However, in the mobile radio environment, noise and fading effects will sometimes cause the clock $\phi$ choice of the correlator to be erratic. To avoid these incorrect changes in the clock, the correlator choice 119 of FIG. 1. is coupled to a logic unit 111 (such as, for example, a suitably programmed microprocessor) that averages the choice of $\phi$ over a predetermined period of time. The result of this averaging, 121, is then coupled to a selector 113 (such as, for example, a multiplexer) which then acts to select or gate the selected $\phi$ signal from all possible $\phi$'s to its output 125. With this averaging provided by logic unit 111, for example, a $\phi$ change is executed only when the correlator indicates a change in a given direction for several consecutive synchronization flags.

The selected $\phi$ signal 125 is then coupled to a delay unit 115. The delay unit consists of two delay elements, a fixed element 131 and a variable element 133. The fixed element 131 is adjusted to compensate for the propagation delay difference between the sampler 141 and correlator data paths and is typically present in receivers using the prior art. In the preferred embodiment, the variable delay element 133 comprises a variable length shift register. The length of this register 133 is controlled by parallel inputs 123 determined by the logic unit 111, which periodically performs a measurement of the clock drift based on the succession of selected $\phi$'s. The shift register 133 is clocked by an external clock source at a frequency large enough so that the maximum delay through the shift register is approximately equal and preferrably slightly larger than the precision of the correlator 107.

Figure 1A:
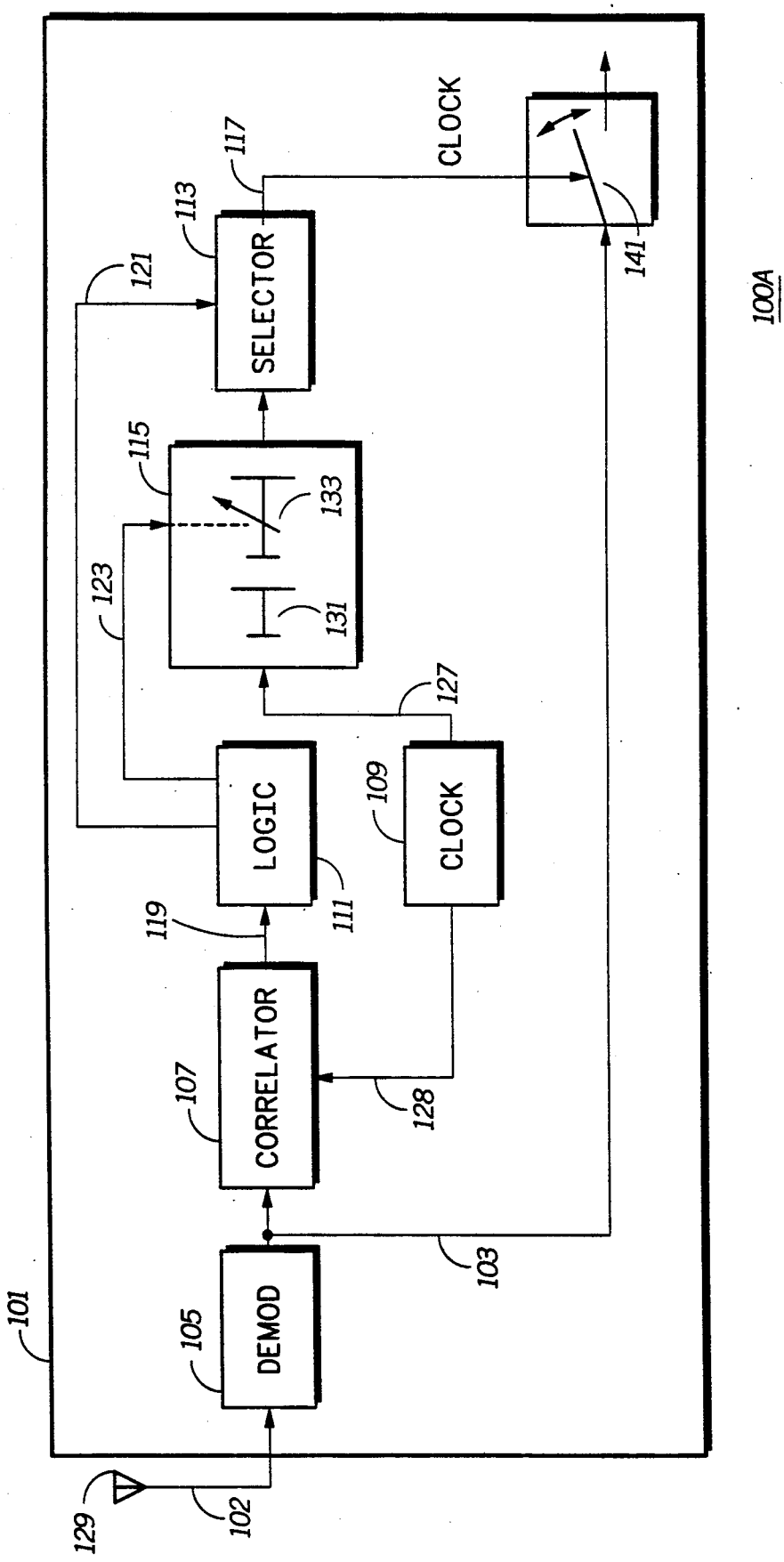
FIG. 1A shows an alternate embodiment of the invention.

With this arrangement, the sample clock as determined by the averaged correlator 125 is input to the variable shift register 133. The length of the shift register 133 is periodically changed by the logic unit 111 to compensate for the measured clock drift. The resulting output is the delayed sample clock 117. It will be appreciated that while FIG. 1 depicts the delay element 115 being after the selector 113, an alternate approach would be to delay the $\phi$ signals before the selector 113. The clock 117 may then, for instance, be used to trigger sampler 141 to recover the data contained in the received signal 103 at the optimum sampling point. Such an alternate embodiment is depicted in FIG. 1A.

Figure 3:
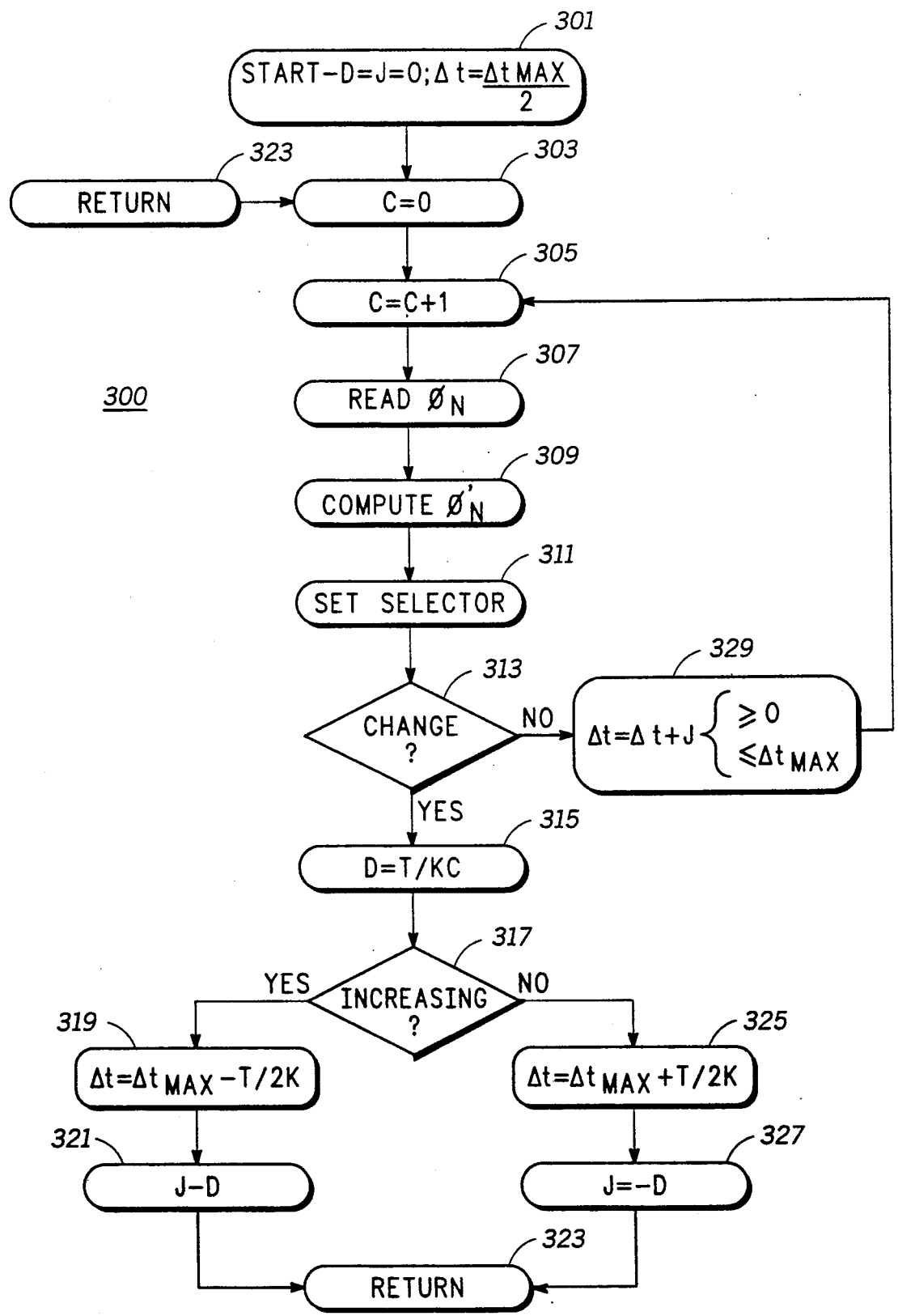
FIG. 3 shows a flow diagram for the first embodiment.

FIG. 3 shows a first flow diagram 300 for the first embodiment. The flow diagram 300 is executed by the logic unit 111 of FIG. 1. In the flow diagram 300, the number of $\phi$'s is represented by the variable K, the symbol period is represented by the variable T, and the maximum delay of the variable delay element (133 of FIG. 1) is represented by the variable $\Delta t_{max}$.

The process starts at step 301, wherein variables D and J are set to initial values of zero (0). The process also initializes the length of the variable delay 133 of FIG. 1, defined as $\Delta t$, to equal $\Delta t_{max}/2$. The process next sets C=0, step 303. The process next increments the current value of C by unity (1), step 305. The process next reads the current (or nth) clock phase from the correlator, $\phi_n$, step 307. The process then computes the average $\phi_n$ ($\phi_n'$) over a predetermined period of time, step 309. Although different averaging processes are possible here, the preferred embodiment follows a non-linear averaging method which restricts the movement of $\phi_n'$ to +/−1 from its previous value. The result from step 309 is then coupled to the selector 113 of FIG. 1, step 311.

The process next determines whether $\phi_n'$ has generally changed from the previous determination, step 313. It will be appreciated that one way of determining this is to save the previously-determined value ($\phi_{n-1}'$) and to determine whether $\phi_n' = \phi_{n-1}'$.

If $\phi_n' = \phi_{n-1}'$, then there has been no change in $\phi_n'$ and so the result of this determination (step 313) is negative, and the process goes to step 329. Here $\Delta t$ is incremented by the present value of J, provided that $\Delta t$ is never allowed to be <0 or >$\Delta t_{max}$. It will be appreciated that this latter provision is necessary since the value of J may itself be presently <0. The process next goes to step 305.

If $\phi_n' \neq \phi_{n-1}'$, then there has been a change in $\phi_n'$ and so the result of this determination (step 313) is affirmative, and the process goes to step 315. Here D is set to the value T/KC. The process then goes to step 317, where it is determined whether $\phi_n'$ is increasing or decreasing. It will be appreciated that one way of determining this is to determine whether $\phi_n' > \phi_{n-1}'$.

If $\phi_n' > \phi_{n-1}'$, then $\phi_n'$ is increasing and so so the result of this determination (step 317) is affirmative, and the process goes to step 319. Here $\Delta t$ is set to $\Delta t_{max}/2 + T/2K$. The process next sets J=D, step 321. The process next returns (step 323) to step 303.

If $\phi_n' < \phi_{n-1}'$, then $\phi_n'$ is decreasing and so the result of this determination (step 317) is negative, and the process goes to step 325. Here $\Delta t$ is set to $\Delta t_{max}/2 + T/2K$. The process next sets J=−D, step 327. The process next returns (step 323) to step 303.

It will be appreciated that one effect of these steps 319 and 325 is to center the delay range in the center of the shift register 133. This provides buffer zones in the shift register where the required delay between changes of $\phi_n'$ may exceed the duration of one phase.

As a result of steps 300, the sample point is maintained near the optimum between phase adjustments.

One advantage of the invention is that, for a given level of correlator 107 precision, much greater precision in the sample clock can be achieved with very little additional hardware. Alternatively, the invention permits a given level of performance to be achieved with a less complex correlator 107. This could have a significant impact in reducing the cost for a receiver.

Figure 4:
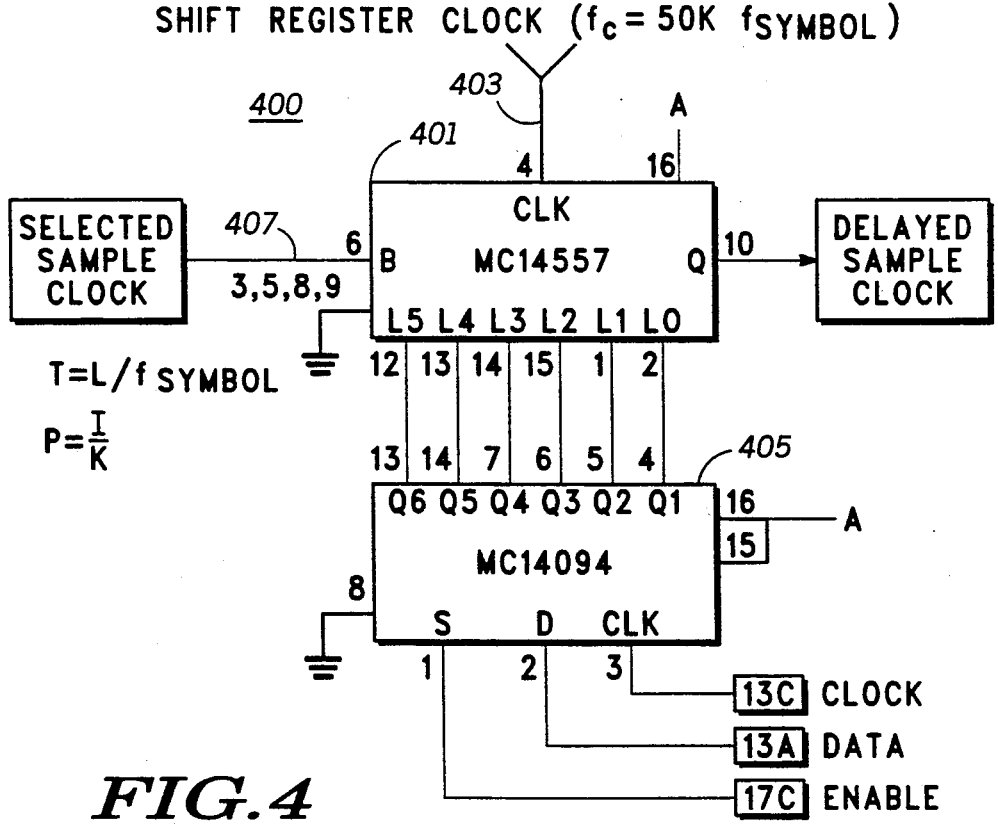
FIG. 4 shows a typical circuit diagram for the first embodiment.

A typical circuit diagram 400 for the first embodiment is shown in FIG. 4. As shown, the delay element is the MC14557 1-64 stage shift register 401. An MC14094 shift register 405 is used as a data register to hold the current value of the shift register length. In FIG. 4, the selected sample clock 407 is at a frequency of $f_{symbol}$ and has a precision, p, of T/K where T is the symbol period and K is the number of sample clock phases $\phi$. A clock source (not shown) provides the shift register clock 403 at a frequency of 50 times K times the frequency of the selected sample clock 407. This provides the delayed sample clock with a resolution of T/K50. Thus a fifty times improvement is provided over the resolution provided by the correlator alone.

While various embodiments of the symbol synchronization circuit, according to the invention, have been described herein, the scope of the invention is defined by the following claims.

What is claimed is:

1. In a receiver having an input signal comprising a stream of symbols at a symbol rate of $f_{symbol}$, and said receiver having a multiplicity of signals $\phi_1$ -$\phi_k$, each signal more or less synchronized with said stream of symbols and each signal having a frequency $f_{clock}$ generally equal to a multiple (m) of $f_{symbol}$, where $m \geq 1$, a method for providing a clock signal, comprising the steps of:
   (a) from time to time selecting one signal from said multiplicity of signals $\phi_1$-$\phi_k$, based at least in part on:
      (i) the synchronization of each signal of said multiplicity of signals $\phi_1$-$\phi_k$ with said stream of symbols; and,
      (ii) the past history of the synchronization of each signal of said multiplicity of signals $\phi_1$-$\phi_k$ with said stream of symbols; and,
   (b) delaying said signal selected in step (a) by a time $\Delta t$ based at least in part on the difference between $f_{symbol}$ and $f_{clock}$; and,
   (c) providing said signal delayed in step (b) as said clock signal.

2. In a receiver having an input signal comprising a stream of symbols at a symbol rate of $f_{symbol}$, and said receiver having a multiplicity of signals $\phi_1$ -$\phi_k$, each signal more or less synchronized with said stream of symbols and each signal having a frequency $f_{clock}$ generally equal to a multiple (m) of $f_{symbol}$, where $m \geq 1$, a method for providing a clock signal, comprising the steps of:
   (a) delaying said signals $\phi_1$-$\phi_k$ by a time $\Delta t$ based at least in part on the difference between $f_{symbol}$ and $f_{clock}$;
   (b) from time to time selecting one signal from said multiplicity of signals $\phi_1$-$\phi_k$ delayed as in step (a), based at least in part on:
      (i) the synchronization of each signal of said multiplicity of signals $\phi_1$-$\phi_k$ with said stream of symbols; and,
      (ii) the past history of the synchronization of each signal of said multiplicity of signals $\phi_1$-$\phi_k$ with said stream of symbols; and,
   (c) providing said signal selected in step (b) as said clock signal.

3. In a data communications modem having an input signal comprising a stream of symbols at a symbol rate $f_{symbol}$, and said data communications modem having a multiplicity of signals $\phi_1$-$\phi_k$, each signal more or less synchronized with said stream of symbols and each signal having a frequency $f_{clock}$ generally equal to a multiple (m) of $f_{symbol}$, where $m \geq 1$, a method for providing a clock signal, comprising the steps of:
   (a) from time to time selecting one signal from said multiplicity of signals $\phi_1$-$\phi_k$, based at least in part on:
      (i) the synchronization of each signal of said multiplicity of signals $\phi_1$-$\phi_k$ with said stream of symbols; and,
      (ii) the past history of the synchronization of each signal of said multiplicity of signals $\phi_1$-$\phi_k$ with said stream of symbols; and,
   (b) delaying said signal selected in step (a) by a time $\Delta t$ based at least in part on the difference between $f_{symbol}$ and $f_{clock}$; and,
   (c) providing said signal delayed in step (b) as said clock signal.

4. In a data communications modem having an input signal comprising a stream of symbols at a symbol rate of $f_{symbol}$, and said data communications modem having a multiplicity of signals $\phi_1$-$\phi_k$, each signal more or less synchronized with said stream of symbols and each signal having a frequency $f_{clock}$ generally equal to a multiple (m) of $f_{symbol}$, where $m \geq 1$, a method for providing a clock signal, comprising the steps of:
   (a) delaying said signals $\phi_1$-$\phi_k$ by a time $\Delta t$ based at least in part on the difference between $f_{symbol}$ and $f_{clock}$;
   (b) from time to time selecting one signal from said multiplicity of signals $\phi_1$-$\phi_k$ delayed as in step (a), based at least in part on:
      (i) the synchronization of each signal of said multiplicity of signals $\phi_1$-$\phi_k$ with said stream of symbols; and,
      (ii) the past history of the synchronization of each signal of said multiplicity of signals $\phi_1$-$\phi_k$ with said stream of symbols; and,
   (c) providing said signal selected in step (b) as said clock signal.

5. A receiver arranged for an input signal comprising a stream of symbols at a symbol rate $f_{symbol}$, and said receiver having a multiplicity of signals $\phi_1$-$\phi_k$, each signal more or less synchronized with said stream of symbols and each signal having a frequency $f_{clock}$ generally equal to a multiple (m) of $f_{symbol}$, where $m \geq 1$, said receiver having a clock signal means comprising:
   means for selecting, from time to time, one signal from said signals $\phi_1$-$\phi_k$, based at least in part on:
      (i) the synchronization of each of said signals $\phi_1$-$\phi_k$ with said stream of symbols; and,
      (ii) the past history of the synchronization of each of said signals $\phi_1$-$\phi_k$ with said stream of symbols; and,
   means for delaying said selected signal by a time $\Delta t$ based at least in part on the difference between $f_{symbol}$ and $f_{clock}$, thus providing a delayed signal; and,
   means for providing said delayed signal as said clock signal.

6. A receiver arranged for an input signal comprising a stream of symbols at a symbol rate $f_{symbol}$, and said receiver having a multiplicity of signals $\phi_1$ -$\phi_k$, each signal more or less synchronized with said stream of symbols and each signal having a frequency $f_{clock}$ generally equal to a multiple (m) of $f_{symbol}$, where $m \geq 1$, said receiver having a clock signal means comprising:
   means for delaying said signals $\phi_1$-$\phi_k$ by a time $\Delta t$ based at least in part on the difference between $f_{symbol}$ and $f_{clock}$;
   means for forming a selected signal including means for selecting, from time to time, one signal from said delayed signals $\phi_1$-$\phi_k$ based at least in part on:
      (i) the synchronization of each of said signals $\phi_1$-$\phi_k$ with said stream of symbols; and,
      (ii) the past history of the synchronization of each of said signals $\phi_1$-$\phi_k$ with said stream of symbols; and,
   means for providing said selected signal as said clock signal.

7. A data communications modem arranged for an input signal comprising a stream of symbols at a symbol rate $f_{symbol}$, and said data communications modem having a multiplicity of signals $\phi_1$-$\phi_k$, each signal more or less synchronized with said stream of symbols and each signal having a frequency $f_{clock}$ generally equal to a multiple (m) of $f_{symbol}$, where $m \geq 1$, said data communications modem having a clock signal means comprising:

means for selecting, from time to time, one signal from said signals $\phi_1$-$\phi_k$, based at least in part on:
  (i) the synchronization of each of said signals $\phi_1$-$\phi_k$ with said stream of symbols; and,
  (ii) the past history of the synchronization of each of said signals $\phi_1$-$\phi_k$ with said stream of symbols; and, means for delaying said selected signal by a time $\Delta t$ based at least in part on the difference between $f_{symbol}$ and $f_{clock}$, thus providing a delayed signal; and, means for providing said delayed signal as said clock signal.

8. A data communications modem arranged for an input signal comprising a stream of symbols at a symbol rate $f_{symbol}$, and said data communications modem having a multiplicity of signals $\phi_1$-$\phi_k$, each signal more or less synchronized with said stream of symbols and each signal having a frequency $f_{clock}$ generally equal to a multiple (m) of $f_{symbol}$, where $m \geq 1$, said data communications modem having a clock signal means comprising:

means for delaying said signals $\phi_1$-$\phi_k$ by a time $\Delta t$ based at least in part on the difference between $f_{symbol}$ and $f_{clock}$;

means for forming a selected signal including means for selecting, from time to time, one signal from said delayed signals $\phi_1$-$\phi_k$ based at least in part on:
  (i) the synchronization of each of said signals $\phi_1$-$\phi_k$ with said stream of symbols; and,
  (ii) the past history of the synchronization of each of said signals $\phi_1$-$\phi_k$ with said stream of symbols; and, means for providing said selected signal as said clock signal.

* * * * *

UNITED STATES PATENT AND TRADEMARK OFFICE
CERTIFICATE OF CORRECTION

PATENT NO. : 5,103,465
DATED : April 7, 1992
INVENTOR(S) : Kenneth J. Crisler and Mark J. Marsan It is certified that error appears in the above-identified patent and that said Letters Patent is hereby corrected as shown below:

ON THE TITLE PAGE:

In the Abstract:

Line 2, "generting" should be --generating--.

In the Claims:

Column 5, line 53, after the word "rate" insert --of--.

Signed and Sealed this

Thirty-first Day of August, 1993

Attest:

BRUCE LEHMAN

Attesting Officer

Commissioner of Patents and Trademarks